US010936692B2

United States Patent
Kleinberg

(10) Patent No.: US 10,936,692 B2
(45) Date of Patent: Mar. 2, 2021

(54) CONTACT INFORMATION MANAGEMENT SYSTEMS AND METHODS USING UNIQUE IDENTIFIERS AND ELECTRONIC CONTACT CARDS

(71) Applicant: K-Notices, LLC, Manhattan Beach, CA (US)

(72) Inventor: Jenny Frieda Kleinberg, Manhattan Beach, CA (US)

(73) Assignee: K-Notices, LLC, Manhattan Beach, CA (US)

(*) Notice: Subject to any disclaimer, the term of this patent is extended or adjusted under 35 U.S.C. 154(b) by 75 days.

(21) Appl. No.: 15/711,942

(22) Filed: Sep. 21, 2017

(65) Prior Publication Data
US 2019/0005145 A1   Jan. 3, 2019

Related U.S. Application Data

(60) Provisional application No. 62/398,013, filed on Sep. 22, 2016.

(51) Int. Cl.
| | | |
|---|---|---|
| G06F 16/00 | (2019.01) | |
| G06F 16/955 | (2019.01) | |
| G06K 7/14 | (2006.01) | |
| G06F 16/93 | (2019.01) | |
| G06F 16/23 | (2019.01) | |
| G06Q 10/10 | (2012.01) | |

(52) U.S. Cl.
CPC ...... *G06F 16/9558* (2019.01); *G06F 16/2358* (2019.01); *G06F 16/2379* (2019.01); *G06F 16/93* (2019.01); *G06F 16/9554* (2019.01); *G06K 7/1413* (2013.01); *G06K 7/1417* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 6,338,071 B1 | 1/2002 | Balaban et al. | |
| 6,760,727 B1 | 7/2004 | Schroeder et al. | |
| 7,051,086 B2 * | 5/2006 | Rhoads | G06F 21/36 |
| | | | 709/219 |
| 7,428,531 B2 | 9/2008 | Barron et al. | |
| 7,743,100 B2 * | 6/2010 | Cheah | H04L 63/08 |
| | | | 709/204 |
| 8,015,041 B2 | 9/2011 | Whitesage | |

(Continued)

FOREIGN PATENT DOCUMENTS

| | | |
|---|---|---|
| CA | 2477506 A1 | 2/2006 |
| WO | WO 2016077348 A1 | 5/2016 |

*Primary Examiner* — Debbie M Le
(74) *Attorney, Agent, or Firm* — Perkins Coie LLP

(57) ABSTRACT

Embodiments described herein disclose methods and systems for managing contact information. The system can create an informational record which is associated with a document and electronic contact card(s) containing contact information. The system can generate a unique identifier associated with the informational record. Users can obtain and view the informational record using the corresponding unique identifier. The system can provide the contact information to a device. Contact information associated with multiple informational records can be changed simultaneously by changing a single electronic contact card.

20 Claims, 20 Drawing Sheets

(56) References Cited

U.S. PATENT DOCUMENTS

| | | | |
|---|---|---|---|
| 8,103,681 B2 | 1/2012 | Littlejohn et al. | |
| 8,571,901 B2 | 10/2013 | Shoen et al. | |
| 8,805,417 B2 | 8/2014 | Angiolillo | |
| 8,856,246 B2* | 10/2014 | Post | G06Q 10/103 |
| | | | 709/205 |
| 8,918,890 B2 | 12/2014 | Nakazawa | |
| 8,943,150 B2* | 1/2015 | Massey | G06F 9/44505 |
| | | | 709/206 |
| 9,075,808 B2* | 7/2015 | Wassingbo | G06F 16/434 |
| 9,760,645 B1* | 9/2017 | Park | G06K 19/06037 |
| 10,346,823 B2* | 7/2019 | Greenwald | G06Q 20/32 |
| 2001/0027472 A1 | 10/2001 | Guan | |
| 2004/0083119 A1 | 8/2004 | Schunder et al. | |
| 2006/0140134 A1* | 6/2006 | O'Brien | G06F 21/10 |
| | | | 370/252 |
| 2013/0185322 A1* | 7/2013 | Vegh | G06Q 10/103 |
| | | | 707/769 |
| 2013/0219070 A1 | 8/2013 | Kramarenko et al. | |
| 2014/0012676 A1* | 1/2014 | Forte | G06Q 30/02 |
| | | | 705/14.64 |
| 2014/0081657 A1* | 3/2014 | Neuvonen | G06F 19/00 |
| | | | 705/3 |
| 2015/0100868 A1* | 4/2015 | Moore | G06F 16/9577 |
| | | | 715/205 |
| 2015/0127568 A1 | 5/2015 | Zehentleitner | |
| 2016/0140168 A1 | 5/2016 | Rankin, Jr. et al. | |
| 2016/0162382 A1 | 6/2016 | Devin | |

* cited by examiner

CONTACT INFORMATION MANAGEMENT SYSTEMS AND METHODS USING UNIQUE IDENTIFIERS AND ELECTRONIC CONTACT CARDS

CROSS-REFERENCE TO RELATED APPLICATIONS

This application is a non-provisional of and claims priority to U.S. Provisional Application No. 62/398,013, filed on Sep. 22, 2016, entitled "CONTACT INFORMATION MANAGEMENT SYSTEMS AND METHODS USING UNIQUE IDENTIFIERS," which is hereby incorporated by reference in its entirety for all purposes.

BACKGROUND

Personal or company information, such as mailing addresses, email addresses, phone numbers, and other contact information in documents (e.g., contracts) is static. A change in the contact information or in interested parties can invoke notice provisions or other legal requirements that necessitate updating potentially thousands of documents or providing time consuming notices to one or multiple other parties.

BRIEF DESCRIPTION OF THE DRAWINGS

FIGS. 6A, 6B, 6C, 7, 8, 9A, 9B, 9C, 10A, 10B, and 11-15 are examples of user interfaces used in some implementations for creating and managing contact information.

Figure 1:
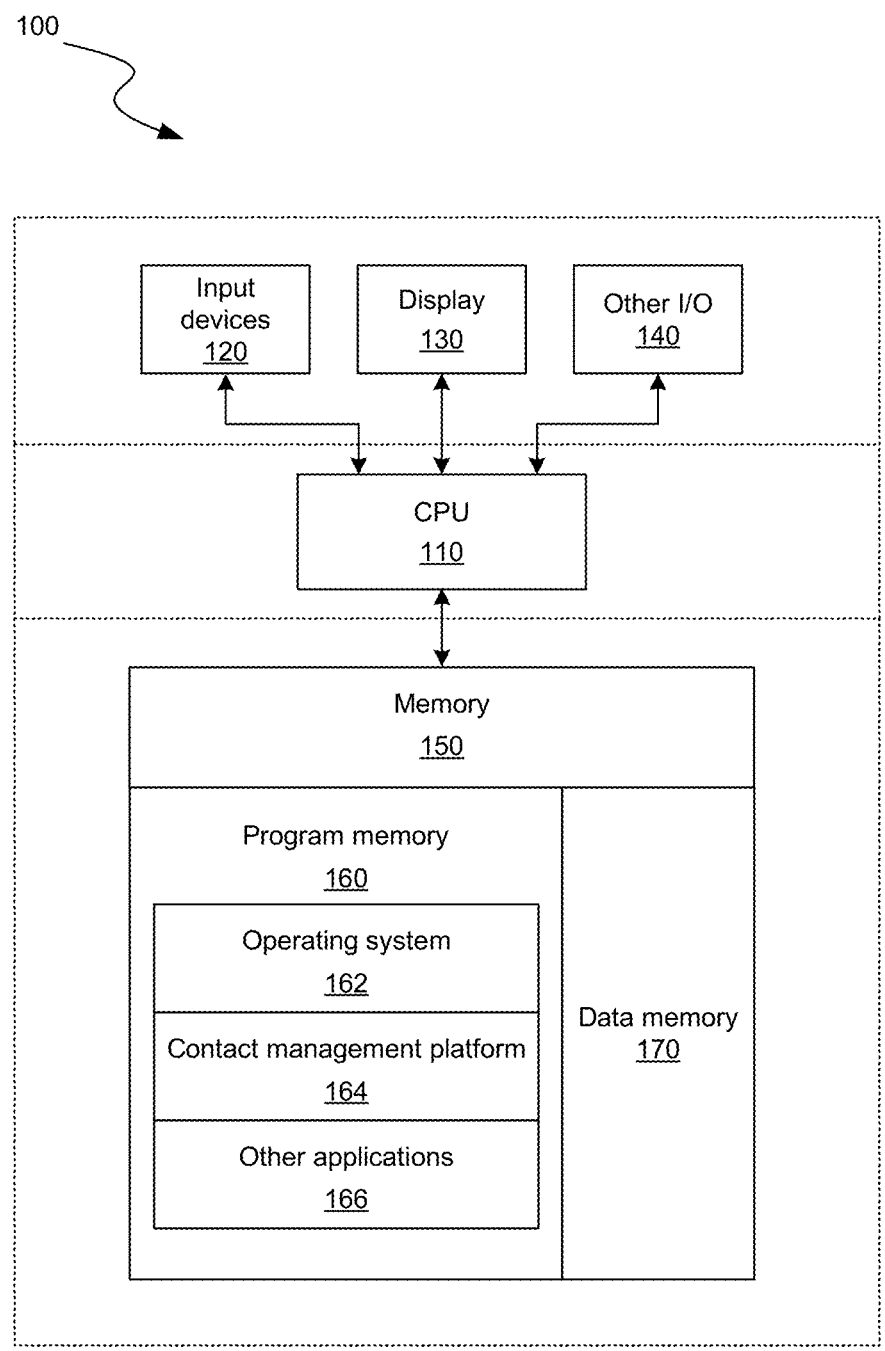
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Embodiments for managing contact and other personal information are disclosed. Personal and company information, such as mailing addresses, rarely remains static, and yet legal documents include static contact information. When contact information changes, notices must be provided to numerous other parties. Determining which parties require the updated information, as well as actually providing the updated information, is time consuming, and the alternative of having inaccurate information in a contract or legal document is equally undesirable. Methods and systems described herein eliminate the need for a user to contact other parties when contact information changes and yet ensure that other parties have the most up-to-date information.

In some implementations, the system can create an informational record. An informational record is associated with a unique identifier and document (e.g., contract, registration form, record, email, or any other written, printed, or electronic matter that provides information or evidence). The informational record can include an identity of the document, one or more electronic business or electronic contact card(s) with contact information that is associated with the document, previous electronic contact cards associated with the document, and other information. The system can generate the unique identifier that corresponds to the informational record. In some implementations, the unique identifier uniquely corresponds to a document (e.g., a contract). The unique identifier can be, for example, a link, a portion of a link, or a code that is input into a website. In some embodiments, the system can embed the unique identifier in a URL or other link, and the unique identifier and/or the link including the unique identifier can be inserted into a document in place of contact information. People with access to the document (and/or the unique identifier) can enter the unique identifier into the system and/or use the link, which, in response, will display the corresponding informational record with contact information (e.g., address, phone, email address, social media account information, etc.) from the electronic contact card(s). While a URL is discussed throughout the specification, other embodiments are contemplated by the disclosure. For example, the unique identifier can be a code that can be input into a website or other access point (even machine-readable codes, such as QR codes where the code or URL is encoded in the QR code or other machine-readable code, which may be printed and affixed to a document).

The owner of the informational record can create, change, modify, transfer, update, organize, and manage the electronic contact card(s) associated with the unique identifier or informational record. The owner of an informational record is an entity or entities who have access to modify and manage the informational record. Entities can be persons, companies, organizations, or other. In some embodiments, the owner of the informational record must have created an account, that is be "registered," with the informational record generating system.

Each informational record can be associated with an electronic contact card or multiple electronic contact cards. An electronic contact card includes contact information such as an address, email address, website, and/or a phone number. An owner can have multiple electronic contact cards. For example, if a business has several different divisions or locations, the owner may need various electronic contact cards. To create an electronic contact card, the owner inputs, via a GUI, contact information into a new electronic contact card form or screen while the owner is logged into the owner's account (e.g., FIG. 6C). As noted above, an informational record can be associated with one or more electronic contact cards. Owners can update electronic contact cards. When an electronic contact card is updated, the electronic contact card is updated for each informational record associated with the electronic contact card. Historical contact information can be stored with the informational record.

The owner can transfer ownership of the informational record and corresponding unique identifier to other users. A transfer may occur, for example, when a company sells assets/contracts or when a service firm creates an informational record for a client and transfers control of the informational record to the client. In an example, if an owner is transferring a contract, the informational record (including the unique identifier) associated with the contract can be transferred to another entity. When an informational record is transferred, electronic contact card(s) stay associated with the owner but is disassociated with the informational record. New electronic contact card(s) are automatically created for the new owner and associated with the transferred informational record. In some embodiments, new electronic contact card(s) include the same contact information from the original electronic contact card(s) until the new owner changes the new electronic contact card(s).

In some embodiments, before ownership of the informational record is transferred, acceptance of the transferred informational record must be received. Thus, the system allows contact information and party information in a contract to be updated easily without modifying the contract itself. The system can save (for the owner and users to see) "activity" for each informational record associated with the unique identifier. "Activity" may include when the informational record was created, when the electronic contact card was changed, previous contact information, when the document was transferred to a different owner, and previous owners.

When a unique identifier, a link with the embedded unique identifier or a link that is the unique identifier is provided to various users and/or inserted into documents (e.g., contracts), the system may receive a request for the website. When the unique identifier is embedded in the link, the unique identifier can be extracted from the URL request. The system can use the unique identifier to obtain the informational record corresponding to the unique identifier and display this information to the requesting party. Moreover, the system can show the requesting party (and the owner of the informational record) when the informational record was created, when the informational record (including associated electronic contact card(s)) was modified, when the unique identifier has been transferred to a different party, and information relating to an associated document (e.g., when a new version of the contract information is available, title of the parties associated with the contract, previous contact information associated with a document, etc.). Such information can be used to manage and organize contracts for an organization. For example, the information can be valuable during litigation or disputes to ensure that parties are properly served and notified because the system provides all versions of informational record with the dates and contact information at the time.

Figure 6A:
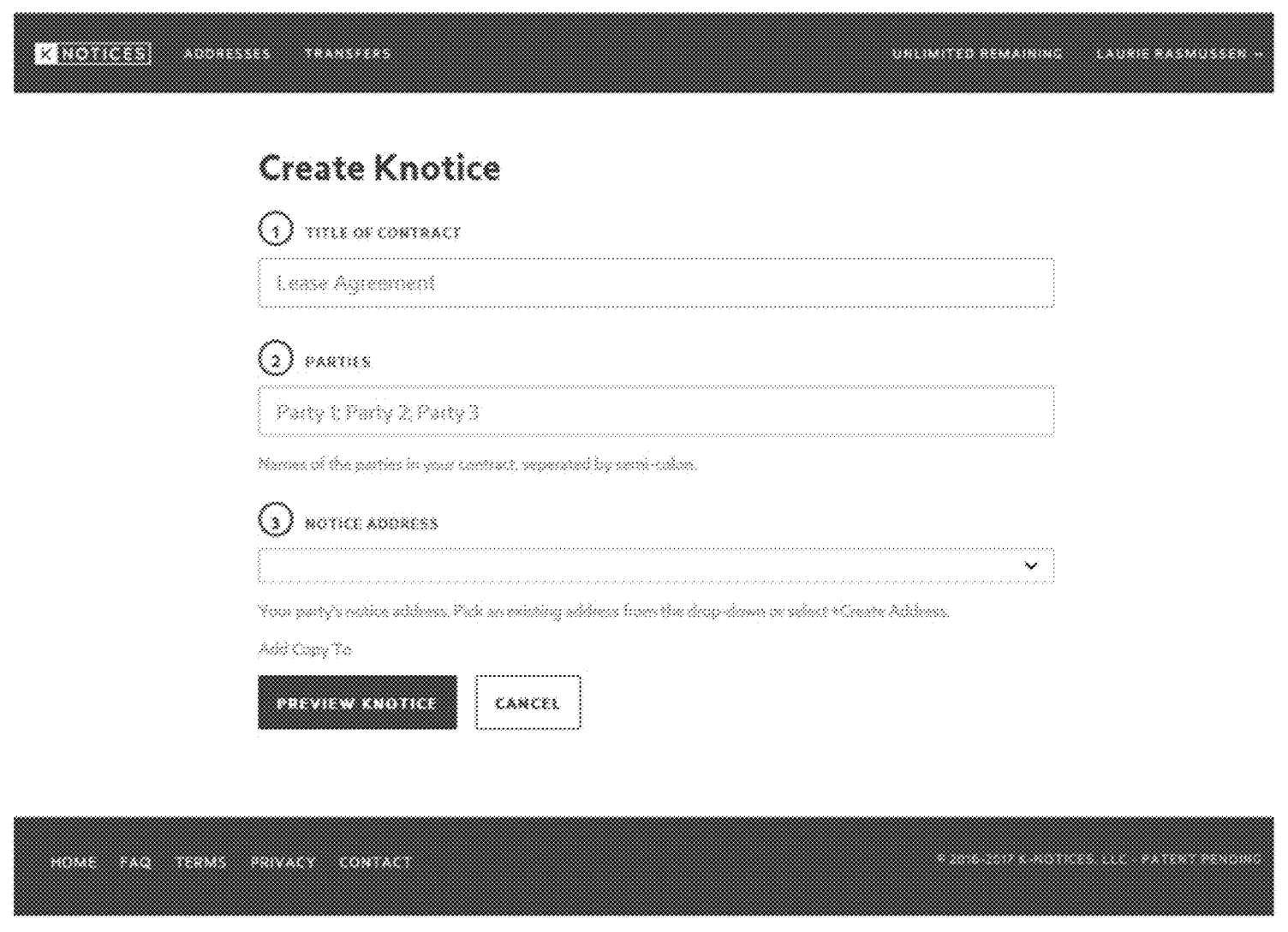
Figure 6B:
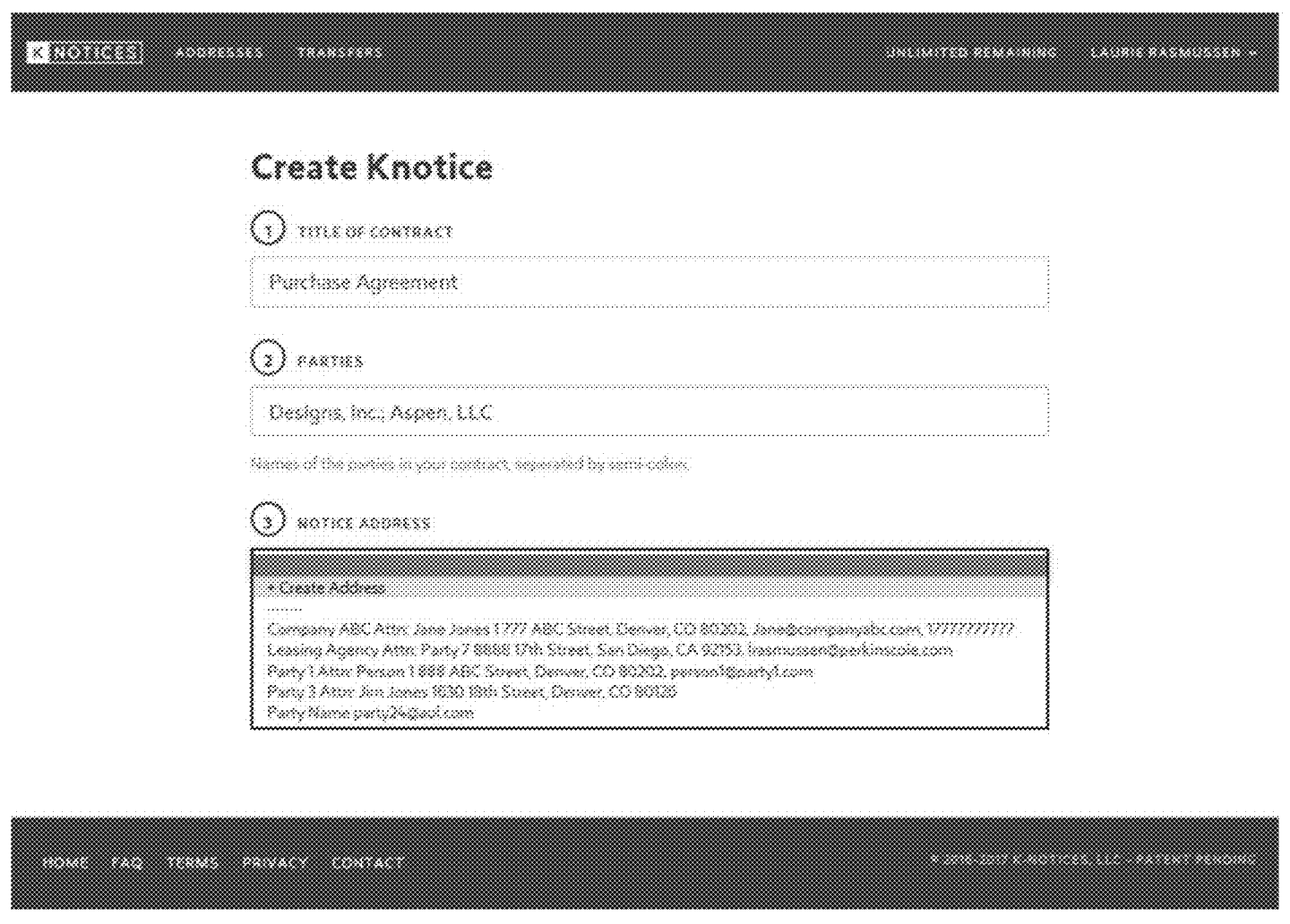
Figure 6C:
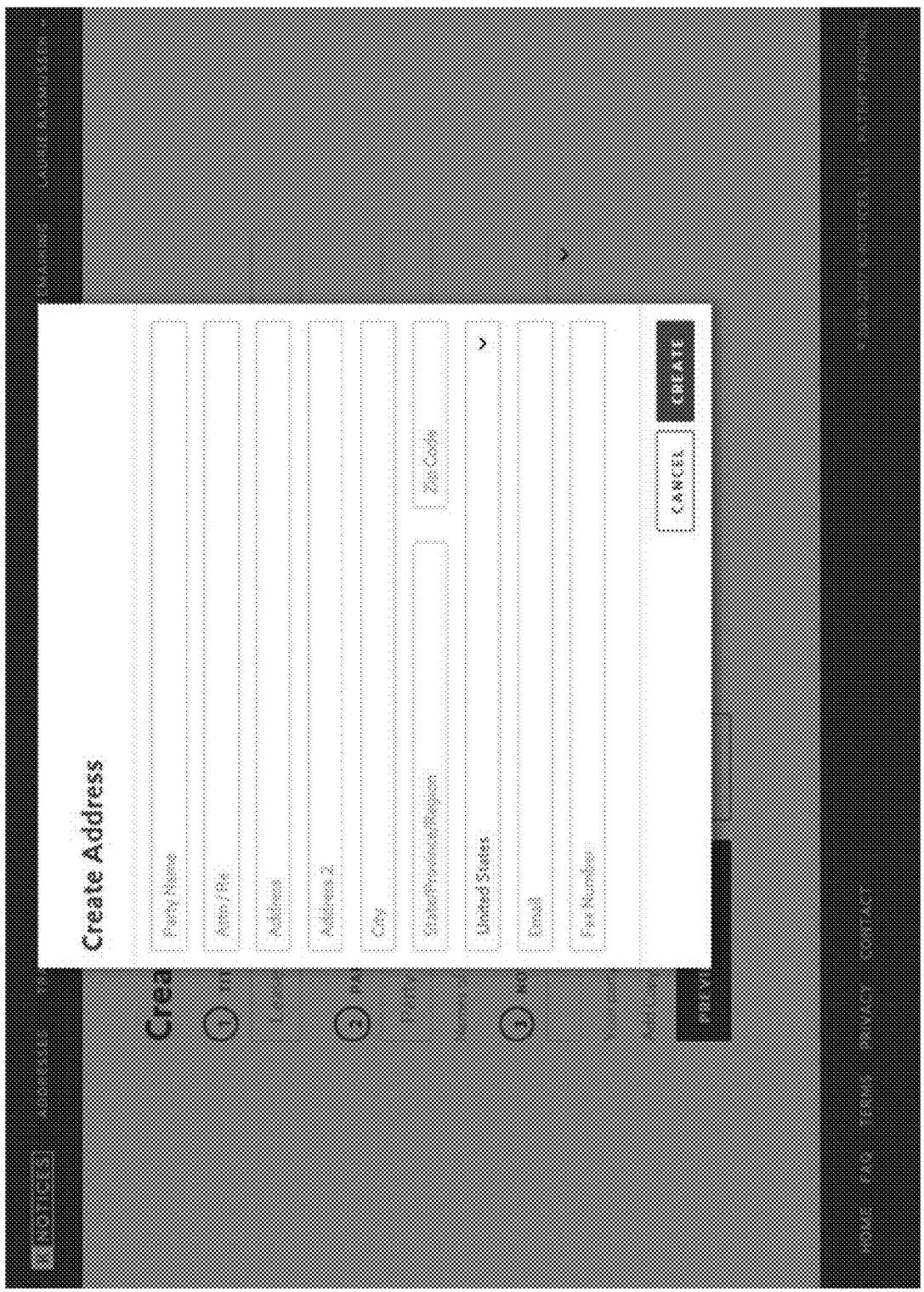

For example, the system can create an informational record by receiving, from an owner, information identifying a name of a document, parties to the document, and electronic contact card(s) relating to the document and/or one of the parties (e.g., FIG. 6A). The owner can choose existing electronic contact card(s) (e.g., FIG. 6B) or the owner can choose to create new electronic contact card(s) to be associated with the informational record (e.g., FIG. 6C). Once the informational record is created, the system can provide a unique identifier, and display the parties, the document and contact information (e.g., FIG. 7). The link (or other unique identifier) associated with the informational record can be placed in the contacts area (e.g. notice address area) of a notice provision of the document or other area where contact information is typically placed. A user (i.e., requesting party) can click or type the link into a browser to request the contact information stored in the associated electronic contact card. The system can receive the request and in response, use the unique identifier to identify the electronic contact card(s) and display the contact information associated with the electronic contact card(s). In some embodiments, the informational record will further display the document, parties to the document, or both depending on the owner's specified preferences. The owner can specify such preference on a document-by-document basis or a global basis. An interface with the most up-to-date contact information can be displayed on the user's interface. In addition, the name of the document, the parties associated with the document, ownership transfers (or other information) can be displayed, if the owner requested the information to be displayed.

Informational records can be tagged so that similar informational records can be grouped for organization (e.g., informational records associated with the same electronic contact card, informational records associated with the same subsidiary, informational records associated with certain types of contracts, informational records associated with the same owner). In some embodiments, the GUI can provide dropdowns of common tags (e.g., buyer, seller, party, electronic contact card, line of business, division, owner of the informational record, entity who drafted document). The system and/or GUI can use the tags for group messaging, displaying data in groupings based on tags, changing information in informational records or electronic contact cards, and transferring informational records. In some embodiments, informational records can include links to confidential data rooms, encrypted documents or secure links to exhibits to contracts, an indication of security interests associated with the document, and secured access to other related or ancillary documents. The owner can also add notes to an informational record. The notes can be searchable and kept private. Thus, the owner can identify multiple records simply based on the notes (e.g., contract drafted by Samuel Hastings).

To update an informational record, the owner can access the system by providing credentials (e.g., username/password). Once authenticated, the owner can select the informational record for which the information needs to be updated. The owner can update information in the informational record. The owner can change an informational record by, for example, (1) selecting a different electronic contact card associated with the informational record or creating a new electronic contact card that is associated with the informational record (e.g., FIG. 9C); (2) selecting the informational records to be changed and selecting whether to change the selected informational records by adding electronic contact card(s), replacing all electronic contact cards associated with the selected informational records with new or previously created electronic contact card(s), or replacing an electronic contact card associated with the informational records with different electronic contact card(s) (i.e., new or existing electronic contact card(s)) (e.g., FIG. 9B); and (3) updating the electronic contact card associated with the informational record, which in turn updates each informational record associated with that electronic contact card simultaneously (e.g., FIGS. 10A-10B).

An owner can transfer one or more informational records. The owner can choose to transfer the informational record to a different party by providing contact information for the other party (e.g., FIG. 11, FIG. 12). The system will send a message to the other party requesting acknowledgement or denial of the transfer. When an acknowledgement from the other party is received accepting the transfer, the other party becomes the owner of the informational record and can change the contact information associated with the unique identifier and document like any other owner. When the other party denies the transfer, the informational record is not transferred.

In some embodiments, the system can accept a message associated with an informational record (e.g., document can be uploaded to a website associated with the informational record). The owner of the informational record would be notified that the system has accepted the message and the owner can view the message. In an example, if the document for an informational record is a contract, the user could upload a notice of default related to such document to the system. In some embodiments, the message/notice is associated with the informational record. Other examples include notice of renewal, notice of request for access, recordation/perfection of a security interest, recordation of the agreement (e.g. recordation of a patent assignment with the U.S. Patent Office, etc.).

This disclosure describes systems and processes designed to manage contact information by providing a dynamic and flexible environment. Various embodiments may provide one or more of the following technological improvements: (1) efficient data management by providing a mapping between contact information, a document and a unique identifier, (2) ability to change contact information associated with an informational record which eliminates manual notification of changes to contact information, (3) ability to update a single electronic contact card to simultaneously identify and change each informational record associated with the electronic contact card, (4) ability to select numerous informational records and update contact information simultaneously (5) improved ability to manage contact information among numerous documents using electronic contact cards, (6) ability to transfer one or multiple informational records to a new owner, and (7) efficient tracking of dates and parties when contact information has changed.

In the following description, for the purposes of explanation, numerous specific details (e.g. screen shots) are set forth in order to provide a thorough understanding of embodiments of the present technology. It will be apparent, however, that embodiments of the present technology may be practiced without some of these specific details Suitable System Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that manage contact information. In some embodiments, the contact information is included in documents such as contracts. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, contact management platform 164, and other application programs 166. Memory 150 can also include data memory 170 that can include contact information, unique identifiers, contracts associated with unique identifiers, dates the contact information was changed and/or the date a new version of the informational record was made available, ownership changes, configuration data, settings, owner options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
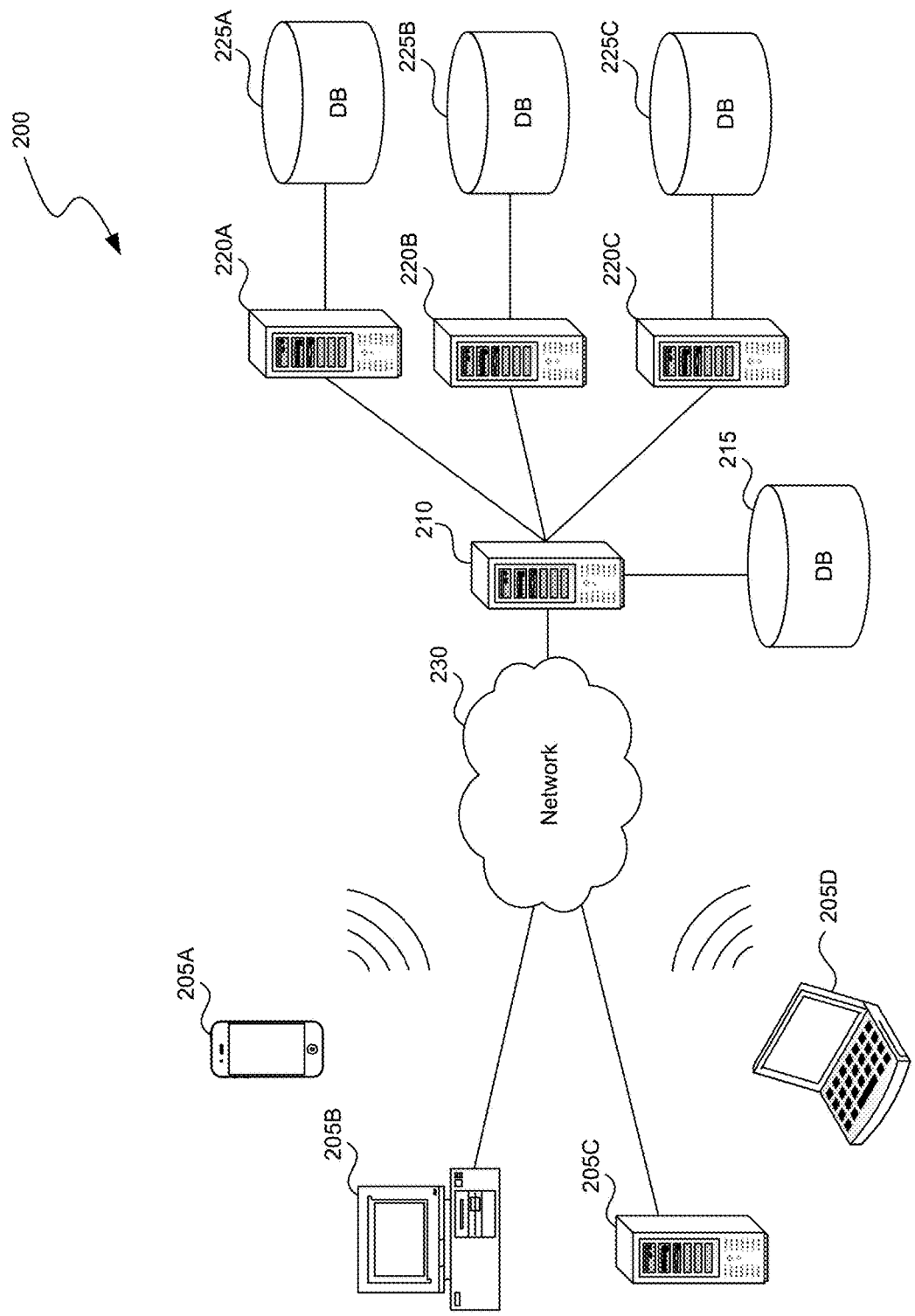
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as electronic contact cards, unique identifiers, contracts associated with unique identifiers, dates informational records were created, dates informational records were changed, dates contact information was changed, previous contact information, or ownership changes. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
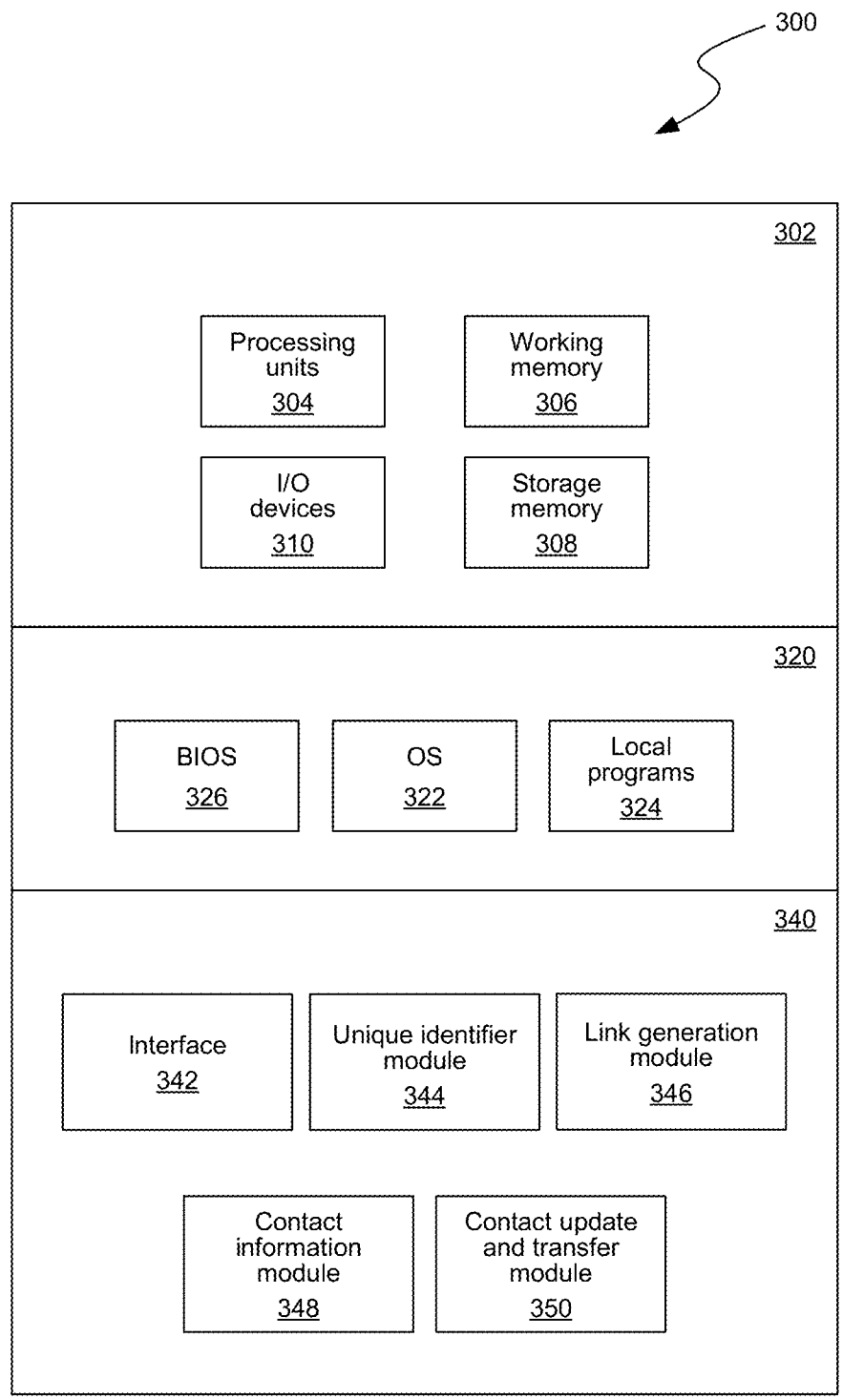
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications, including an operating system 322, local programs 324, and a basic input output system (BIOS) 326. Specialized components 340 can be subcomponents of a general software application 320, such as local programs 324. Specialized components 340 can include unique identifier module 344, link generation module 346, contact information module 348, contact update and transfer module 350, and components that can be used for transferring data and controlling the specialized components, such as interface 342. In some implementations, components 300 can be in a computing system that is distributed across multiple computing devices or can be an interface to a server-based application executing one or more of specialized components 340.

Unique identifier module 344 can generate unique identifiers that are mapped to informational records which are associated with electronic contact cards that contain contact information (e.g., name of a responsible person, mailing address, email address) associated with an entity (e.g., person, company, legal representative) in a database. The informational record may further be associated with a document. In some implementations, the unique identifier can be a combination of words, numbers, characters, images and symbols. To create the informational record, unique identifier module 344 can receive an indication of electronic contact card(s) (i.e., the owner selects electronic contact card(s) or creates electronic contact card(s)) and document information from an owner who has registered with the service and has an account. The owner of the informational record can update the information associated with the unique identifier (i.e., electronic contact card(s), contract information). The informational record, including the unique identifier, can be transferred to another entity (e.g., via contact update and transfer module 350). Using a unique identifier, parties needing or wanting to know the contact information can easily obtain such information (e.g., by going to a link that includes the unique identifier, typing a code into a website).

Unique identifiers can be included in documents and can uniquely identify the informational record, which includes an identity of a document and contact information for a party to the document contained in an electronic contact card. In some implementations, each unique identifier is associated with a different document. The unique identifier module can automatically create identifiers algorithmically, such as by using a hashing algorithm on a user's name and time of day or other information. A unique identifier may look like the following: ppd7zf8a9g4. Unique identifiers can be generated when an owner is logged into an account. In other embodiments, unique identifiers can be generated and associated with a document while the user has the document open. That is, the document can be linked to a system that creates informational records and corresponding unique identifiers and the unique identifier can be associated with an informational record and automatically placed in the document, using, for example, executable code.

Link generation module 346 generates a universal remote locator (i.e., link) with a unique identifier embedded within the link. This link can be provided on contracts, in a website, or anywhere where contact information is used. Interested parties can use the link to obtain the contact information. An example of a link with an embedded unique identifier look like the following: https://www.knotices.com/ppd7zf8a9g4. In other embodiments, the unique identifier may be a code that is input into a particular website to obtain the contact information. In other embodiments, the unique identifier be a link.

Contact information module 348 receives a request to obtain contact information. The request may be received via a link from a remote computer, and the link can include a unique identifier generated by unique identifier module 344. Contact information module 348 can extract the unique identifier from the link and map the unique identifier to an informational record with an associated electronic contact card(s) containing the contact information. Contact information module 348 can format and display the contact information and any other relevant information such as owner, date(s) information changed, previous contact information, related document, version of the informational record, previous contact information, and owner of the informational record. In some embodiments, such information is displayed based on accesses associated with the unique identifier or preferences of the owner. For example, the owner may have provided a preference to display the title of the document in which the unique identifier refers, the parties to the document, and/or the owner of the informational record.

Contact update and transfer module 350 receives requests to update contact information or ownership information from the owner of an informational record. In some implementations, the owner can provide login credentials to change the informational record, contact information, or ownership information associated with an informational record. The updates can be stored in a database such that when a link with the unique identifier is accessed, the new contact information is displayed. Fields stored for each informational record can include versions of each informational record and dates the versions were created, archived, and transferred.

Multiple informational records can be changed at the same time. For example, the owner can select which informational records should be changed (e.g., the owner may select each document that needs updated information), the type of change (e.g., add address, replace address, replace all matching addresses), and the change to make (e.g., an email address, mailing address, new person to be contacted). Contact update and transfer module 350 can change the contact information in the electronic contact cards. When an owner changes the contact information in an electronic contact card, all informational records associated with a changed electronic contact card automatically have updated information. Prior contact information can be stored in the informational record but the prior contact information is no longer referenced in the electronic contact card.

The owner may further provide updates regarding documents associated with the unique identifier (e.g., document name and/or version, parties, creation date). Thus, new contact information for many informational records can effectively be updated with minimal interactions. Informational records are stored in a database on a server and mapped to unique identifiers and electronic contact cards, which are also stored in a database in a server. Other information that can be stored include contract data (e.g., title, parties, dates), how many informational records are owned by an entity, transferred informational records, and account data of owners (e.g., email addresses).

In some implementations, the owner can transfer an informational record to another entity, though in some implementations, the informational record will not be transferred until the transferee accepts the transfer. Contact update and transfer module 350 can send a request for contact information of a second owner (e.g., email address). The receiving owner can accept or decline ownership of the informational record. Assuming the receiving owner accepts the transfer of the informational record, the receiving owner will have the access to change the informational record. Contact update and transfer module 350 can record the date information is changed or ownership is updated. Such information can be displayed on a remote computer when the link with the unique identifier is received by contact update and transfer module 350.

When an informational record is transferred, the electronic contact card(s) remain associated with the owner but is disassociated with the informational record. New electronic contact card(s) are automatically created for the new owner, but until the new owner changes the new electronic contact card(s), the contact information in the electronic contact card(s) will stay the same as it was under the previous owner.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
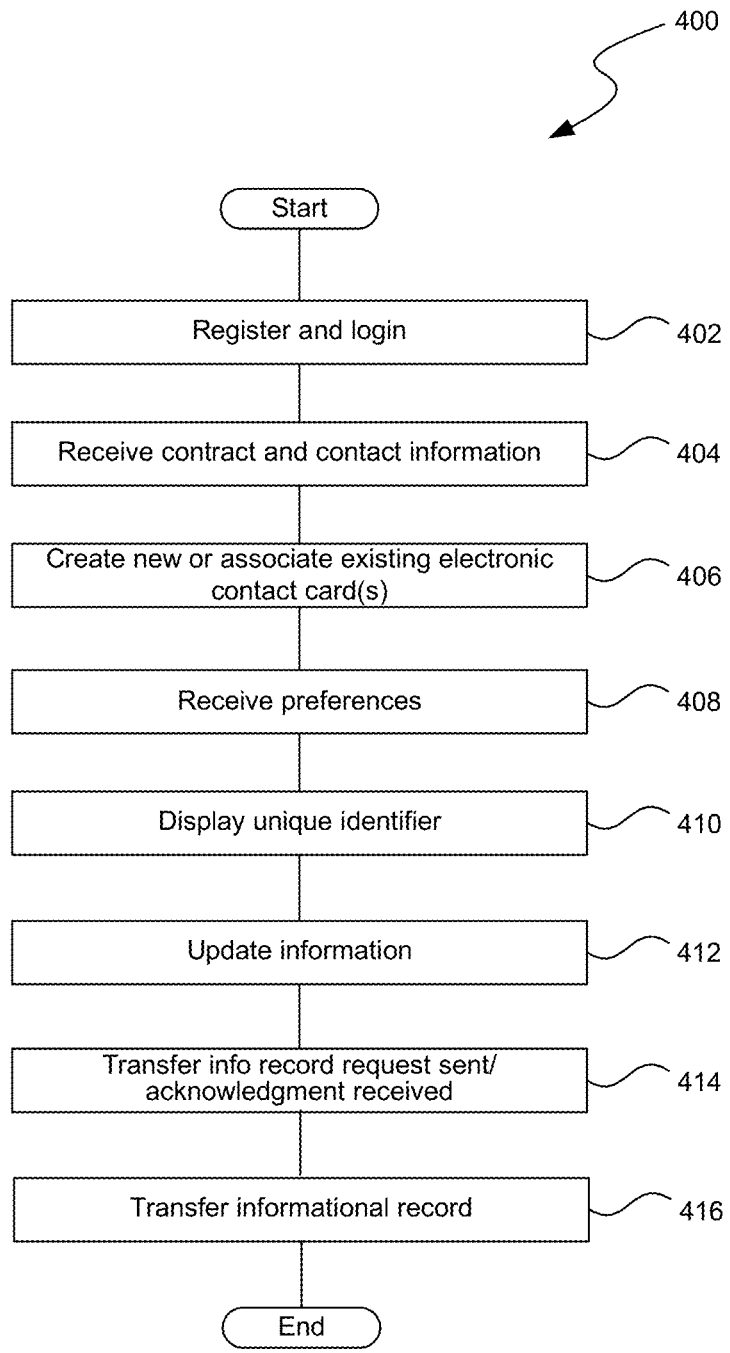
FIG. 4 is a flow diagram illustrating a process used in some implementations for creating and managing contact information.

FIG. 4 is a flow diagram illustrating a set of operations 400 for creating and managing contact information. In some embodiments, in this and other flow diagrams of operations, fewer than all of the operations in the set of operations are performed, whereas, in other embodiments, additional operations are performed. Moreover, in some embodiments, the operations may be performed in different orders or in parallel. The operations can be performed by components illustrated in FIGS. 1-3.

Registering operation 402 registers an owner after receiving a registration request, allowing the owner to own and create informational records, which include electronic contact cards that can be associated with one or more documents via a unique identifier. The owner may provide authentication credentials, preferences, and/or security information during the registration process. Receiving operation 404 receives document information (e.g., a name of an agreement, parties) and contact information for one or more of the parties associated with the agreement.

Creating or associating operation 406 creates a new contact card if the contact information is new or associates an existing electronic contact card with the informational record. Preferences operation 408 provides preferences for the informational record (e.g., whether to hide the parties and the document in the informational record, whether to show the owner of the informational record). Displaying operation 410 displays, at a remote device, a unique identifier generated by the system for the document. Updating operation 412 updates the contact information associated with an informational record. To update contact information associated with an informational record, the owner can either (1) select an electronic contact card and update the information (which in turn updates each informational record associated with the electronic contact card), (2) select different existing electronic contact card(s) to be associated with the informational record, or (3) create new electronic contact card(s). Transferring operation 414 receives a request to transfer the informational record to a different owner. Once an acknowledgement by the transferee is accepted, the informational record is transferred in transferring operation 416.

Figure 5:
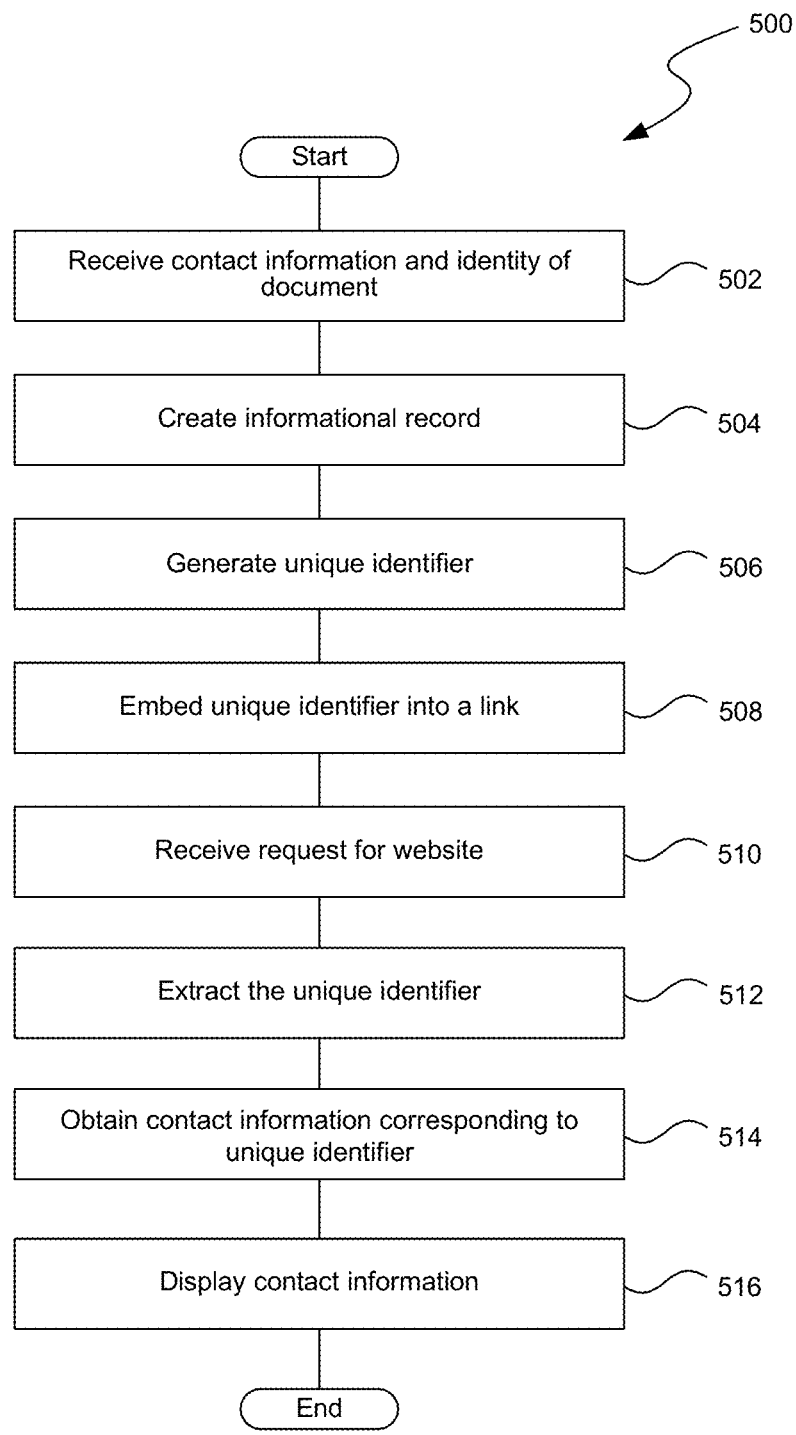
FIG. 5 is a flow diagram illustrating a process used in some implementations for creating and managing contact information.

FIG. 5 is a flow diagram illustrating a set of operations 500 for creating and managing contact information. Receiving operation 502 receives an identity of a document and a selection or creation of electronic contact card(s) containing contact information. Such contact information can be associated with a party associated with the particular document, and details of the particular document can be provided (e.g., parties, title). Creating operation 504 creates an informational record associated with the document and the electronic contact card(s). Generating operation 506 generates a unique identifier that is associated with the informational record. The unique identifier can be mapped to the electronic contact card(s). In some embodiments, the unique identifier is unique to the document in the system. Embedding operation 508 embeds the unique identifier into the link directed to the informational record. The link, or the unique identifier itself, can be provided in the document instead of using typical static contact information included on a document.

Receiving operation 510 receives a request for the website with the unique identifier from a remote computer. Extracting operation 512 extracts the unique identifier from the request, and the unique identifier is used to obtain contact information in electronic contact card(s) corresponding to the unique identifier in obtaining operation 514. Displaying operation 516 can display the current contact information on a display device.

FIGS. 6A, 6B, 6C, 7, 8, 9A, 9B, 9C, 10A, 10B, and 11-15 are examples of user interfaces that can be used in some implementations. FIG. 6A depicts an example of a user interface for creating an informational record. The owner of the informational record can specify the title of a document (e.g., contract), parties to the document, and contact information for the document (e.g., address). The contact information can be selected by selecting existing electronic contact card(s) or creating new electronic contact card(s), as shown in FIGS. 6B-6C. The owner can further add multiple notice addresses by selecting or creating additional electronic contact cards by selecting "Add Copy To."

Figure 7:
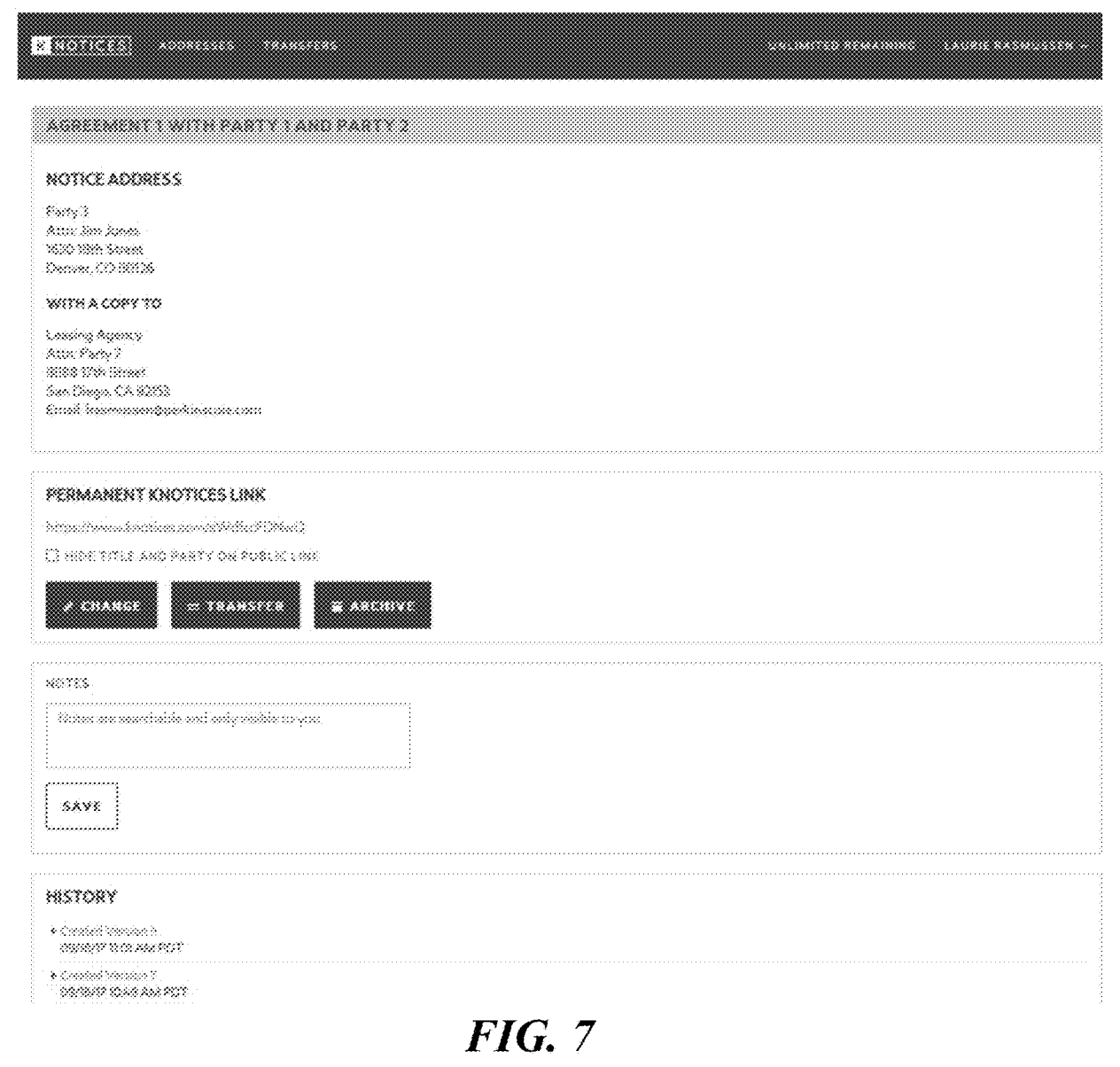
Figure 8:
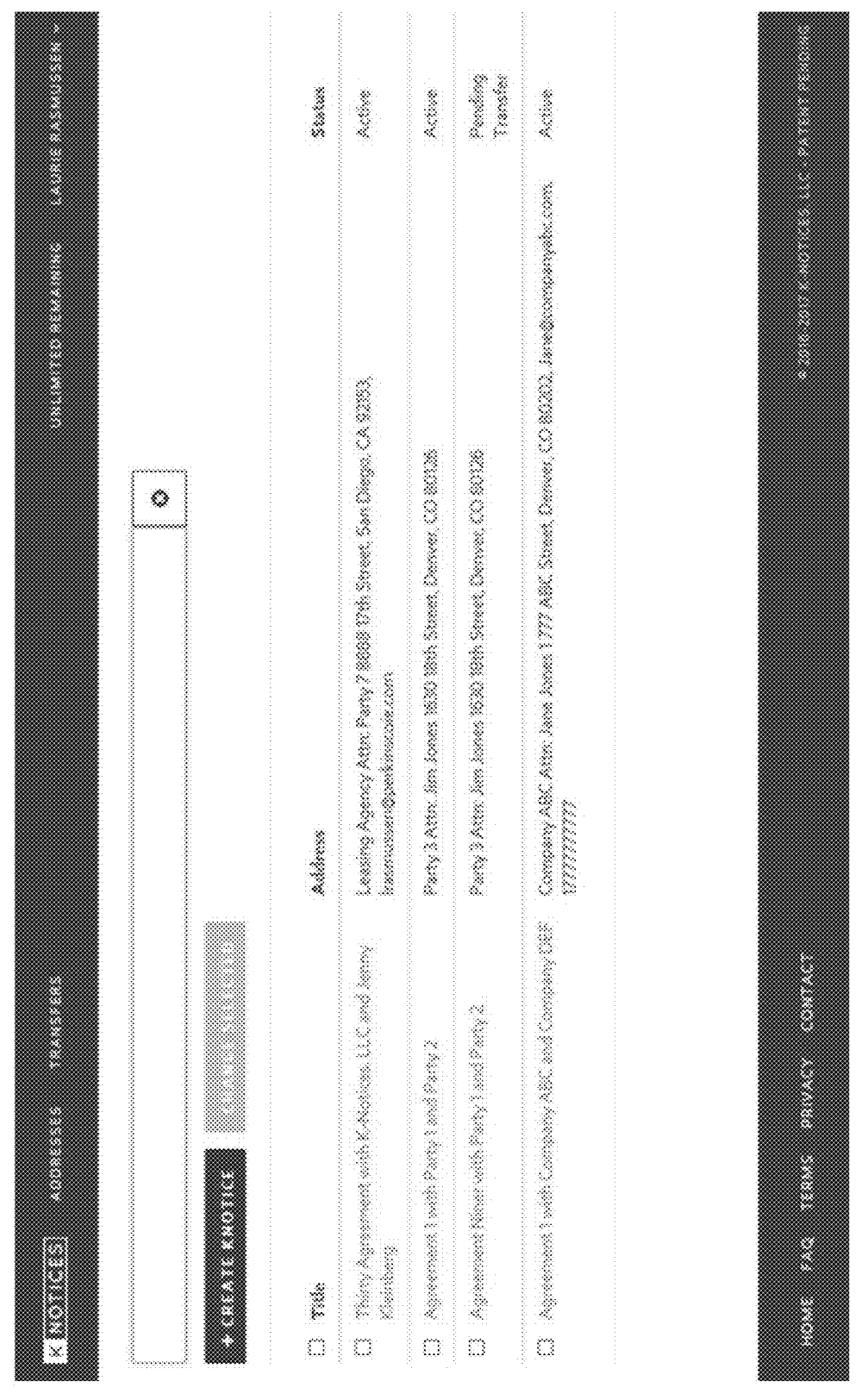

FIG. 7 depicts an example of an informational record from the owner's perspective. The contact information (e.g., address) can be displayed, as well as the link and any activity (e.g., when the informational record was created, when a draft was created, when the informational record was published, historical contact information). The owner can select whether the owner would like to change the informational record, transfer the informational record or archive the informational record. The owner can also provide preferences such as hiding the title and the parties on the informational record. The owner can insert notes that are searchable and visible only to the owner. FIG. 8 depicts a list of all the informational records associated with the owner and the status of the informational record (e.g., active, archived). The informational record can be identified by the title of the document associated with the informational record. The title of the document can be a link to the information about the informational record. When the linked is selected, the owner may be directed to a user interface such as the user interface depicted in FIG. 7. The owner can search informational records by document name, address, party name, notes, type of document, notes, or any other words in the informational record.

Figure 9A:
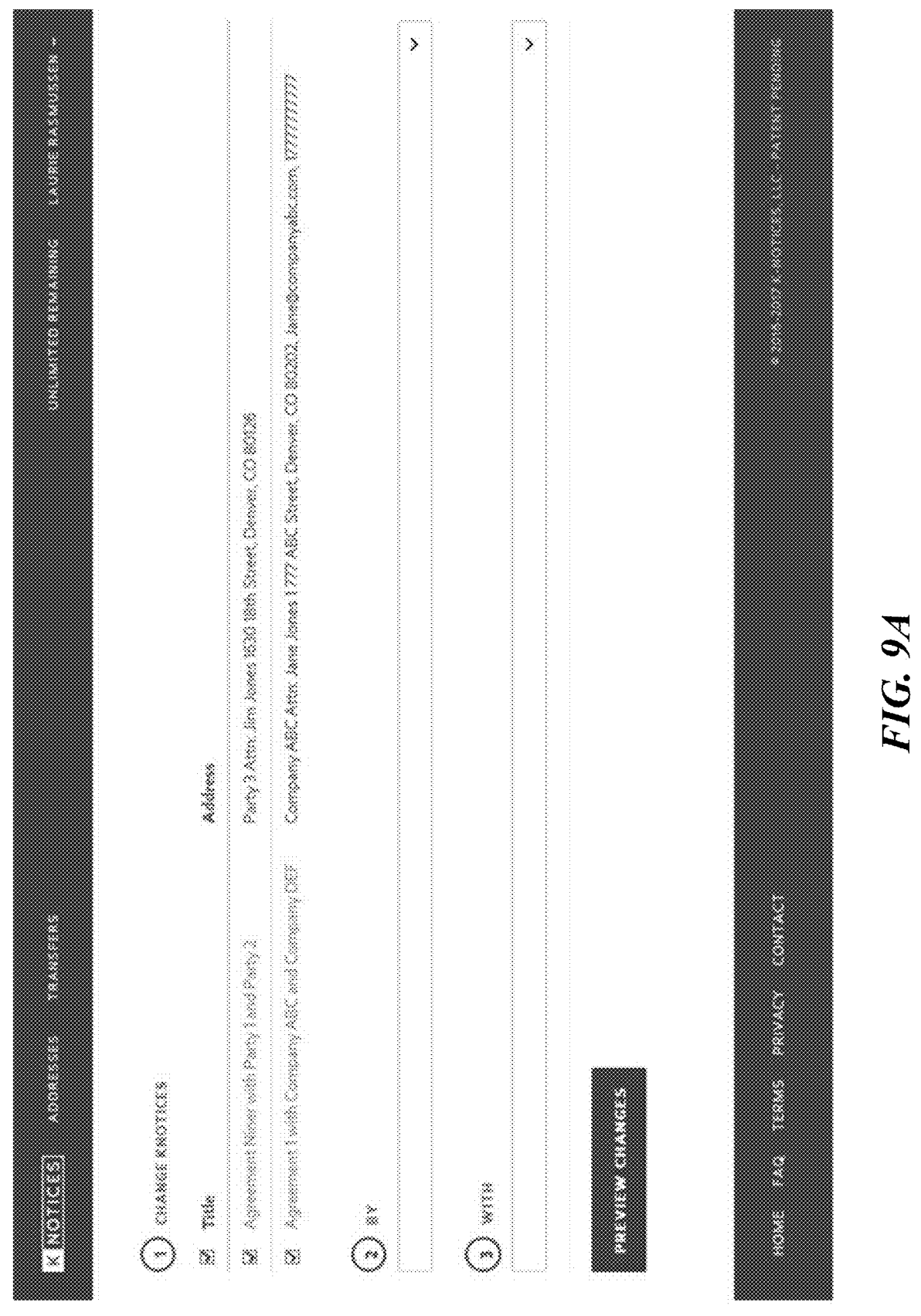
Figure 9B:
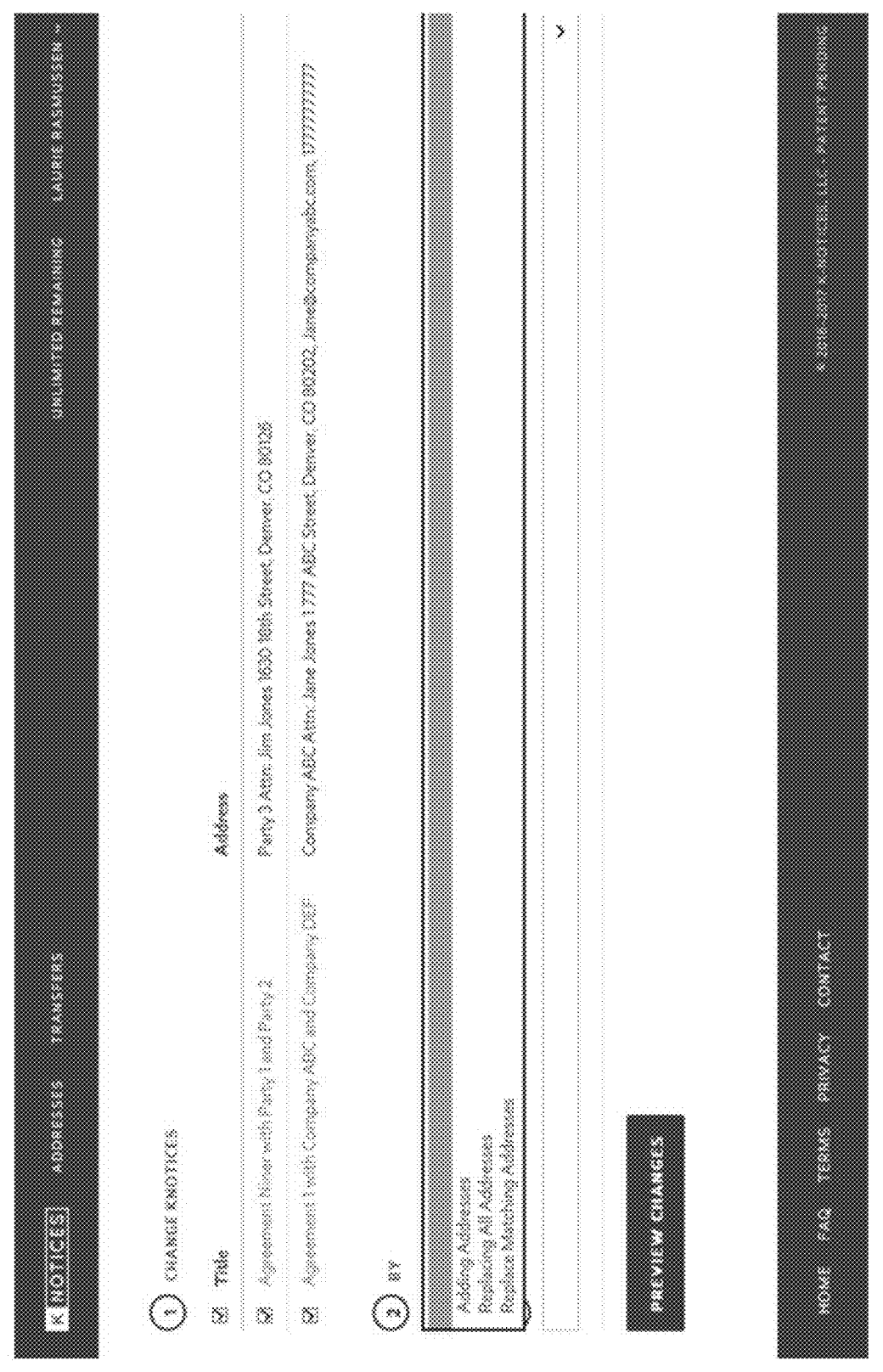
Figure 9C:
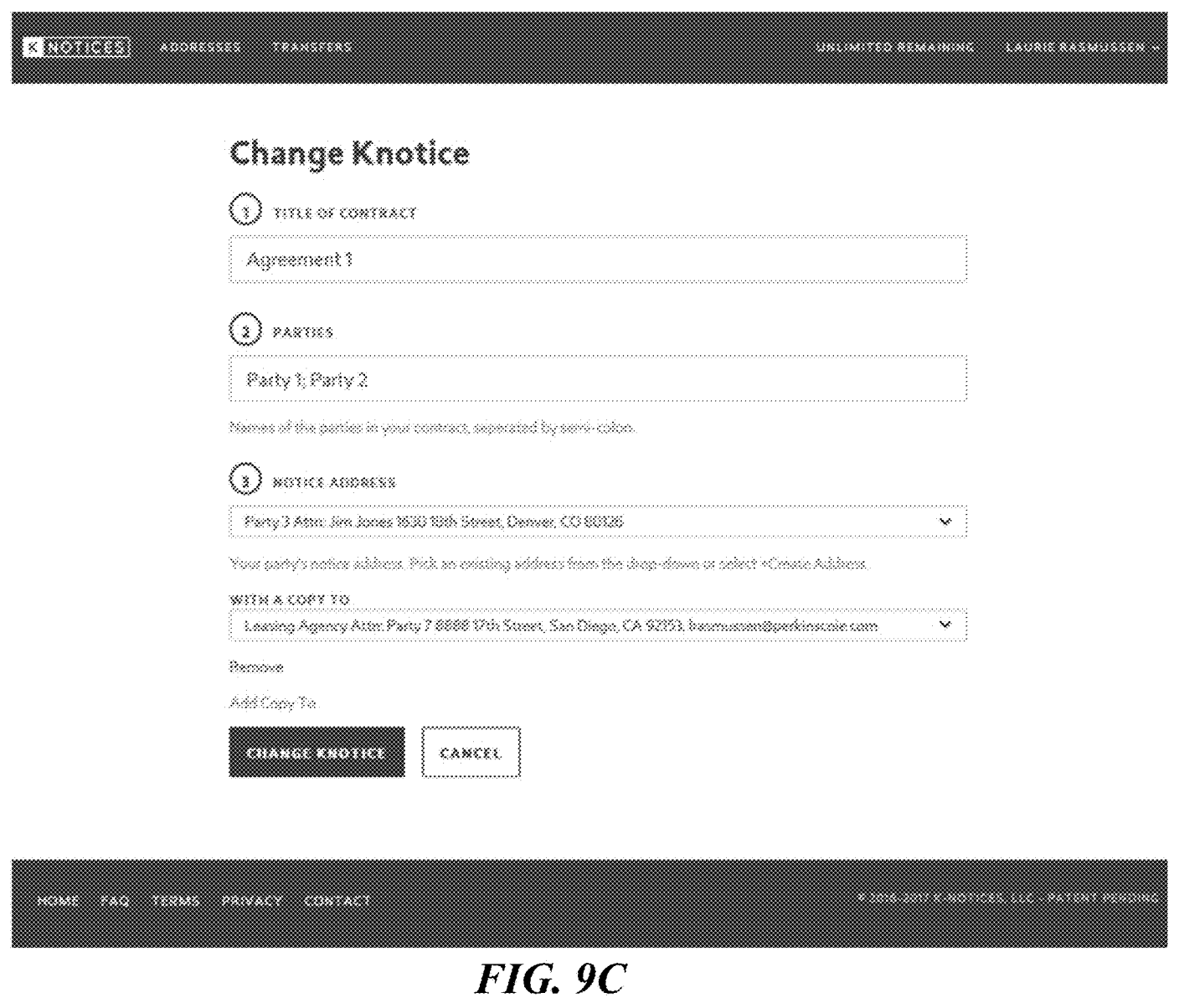

FIG. 9A depicts an example of a user interface for changing contact information associated with multiple informational records. The owner can select one or more informational records from a selectable list of informational records. The selected informational records can be displayed. The owner can then select how the owner would like to change the selected informational records. As shown in FIG. 9B, choices to change an informational record include "Adding Addresses" (i.e., add electronic contact card(s)), "Replacing All Addresses" (i.e., replace all electronic contact cards associated with the informational record with different electronic contact card(s)), and "Replacing Matching Addresses" (i.e., replace a selected electronic contact card with different electronic contact card(s)). FIG. 9C depicts a second example of a user interface that allows an owner to change the informational record. Once the owner has selected the informational record to change, the owner can change the title of the document, parties and electronic contact card(s) associated (i.e., notice address).

Figure 10A:
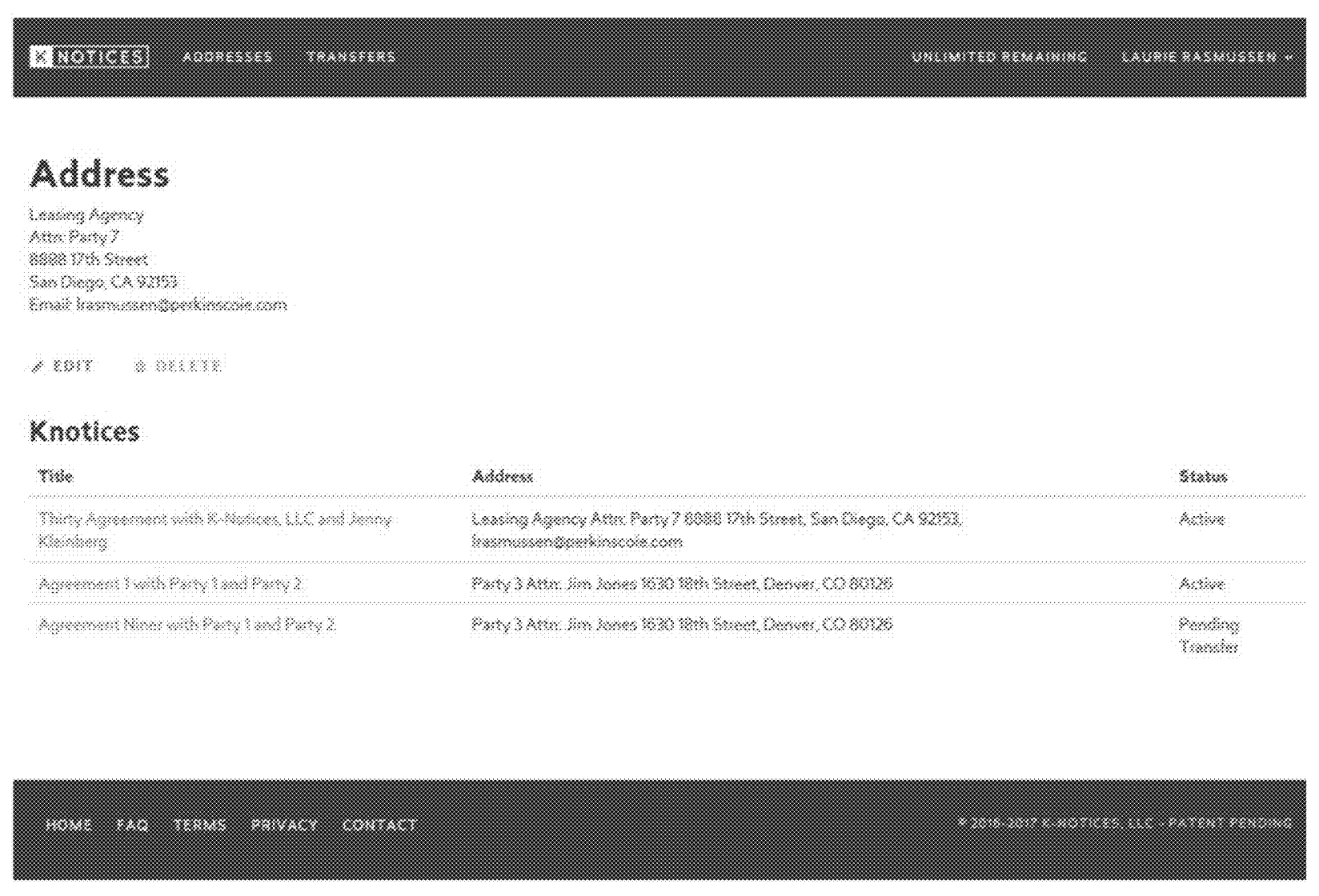
Figure 10B:
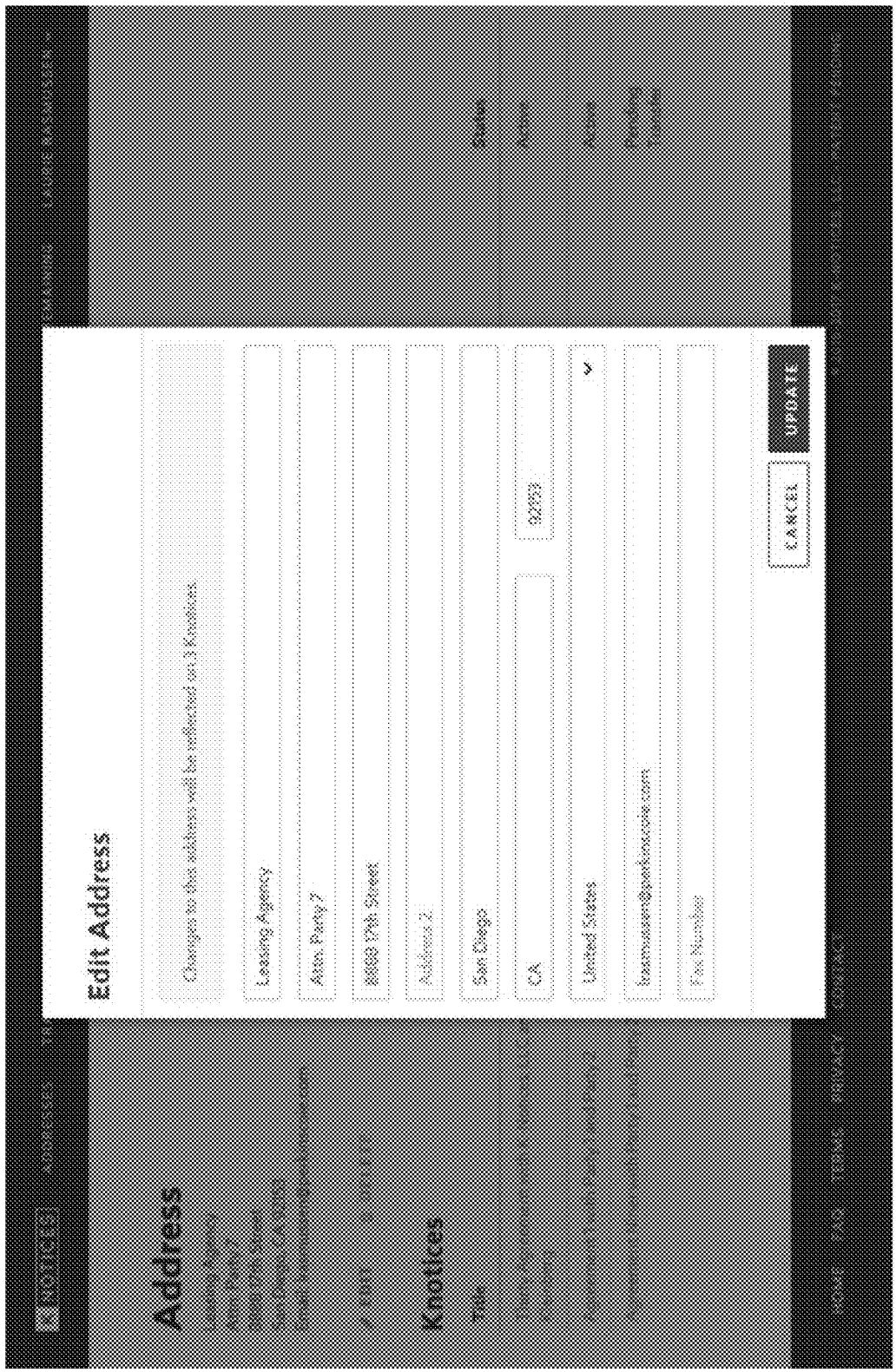

FIG. 10A depicts an example of an electronic contact card. If the owner selects an electronic contact card, the user interface can display all the informational records associated with that electronic contact card. FIG. 10B depicts a user interface the owner will see if the owner chooses to edit the electronic contact card. When the user updates the electronic contact card, each informational record containing such electronic contact card will be updated with the updated electronic contact card. The previous contact information associated with an electronic contact card can be shown in the history of the informational record. (FIG. 10B also shows an example of a GUI for creating a new contact card.)

Figure 11:
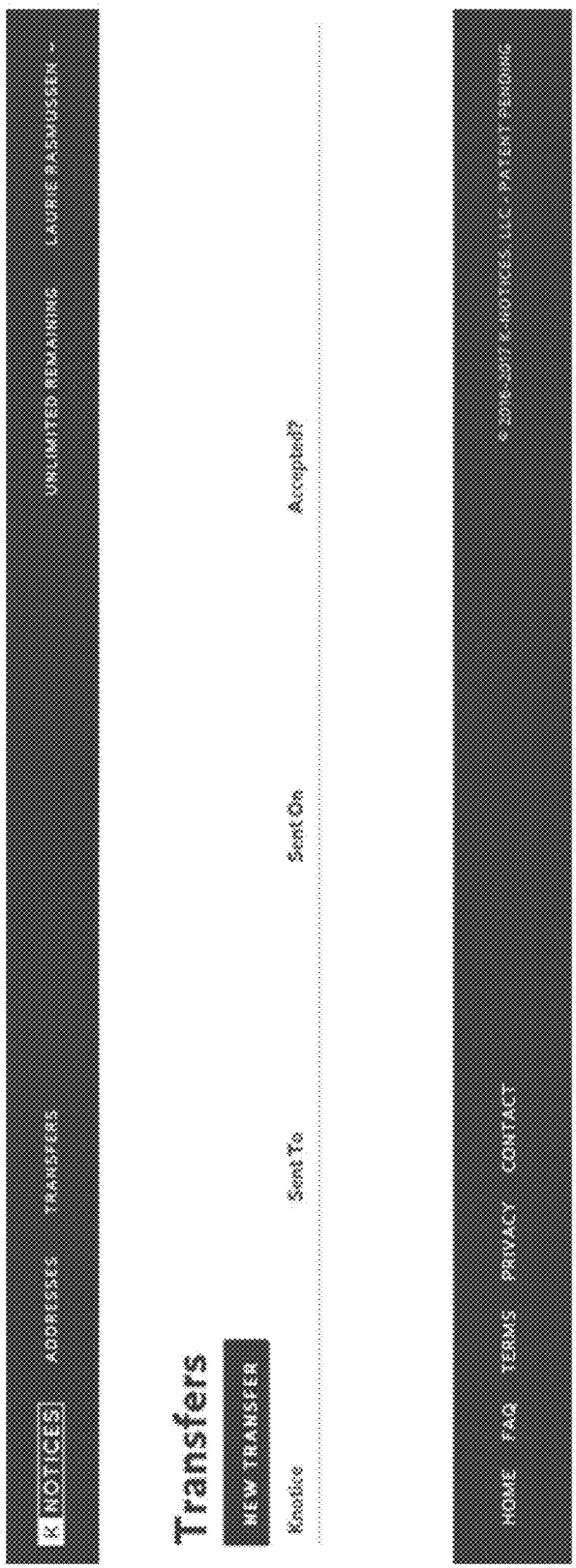
Figure 12:
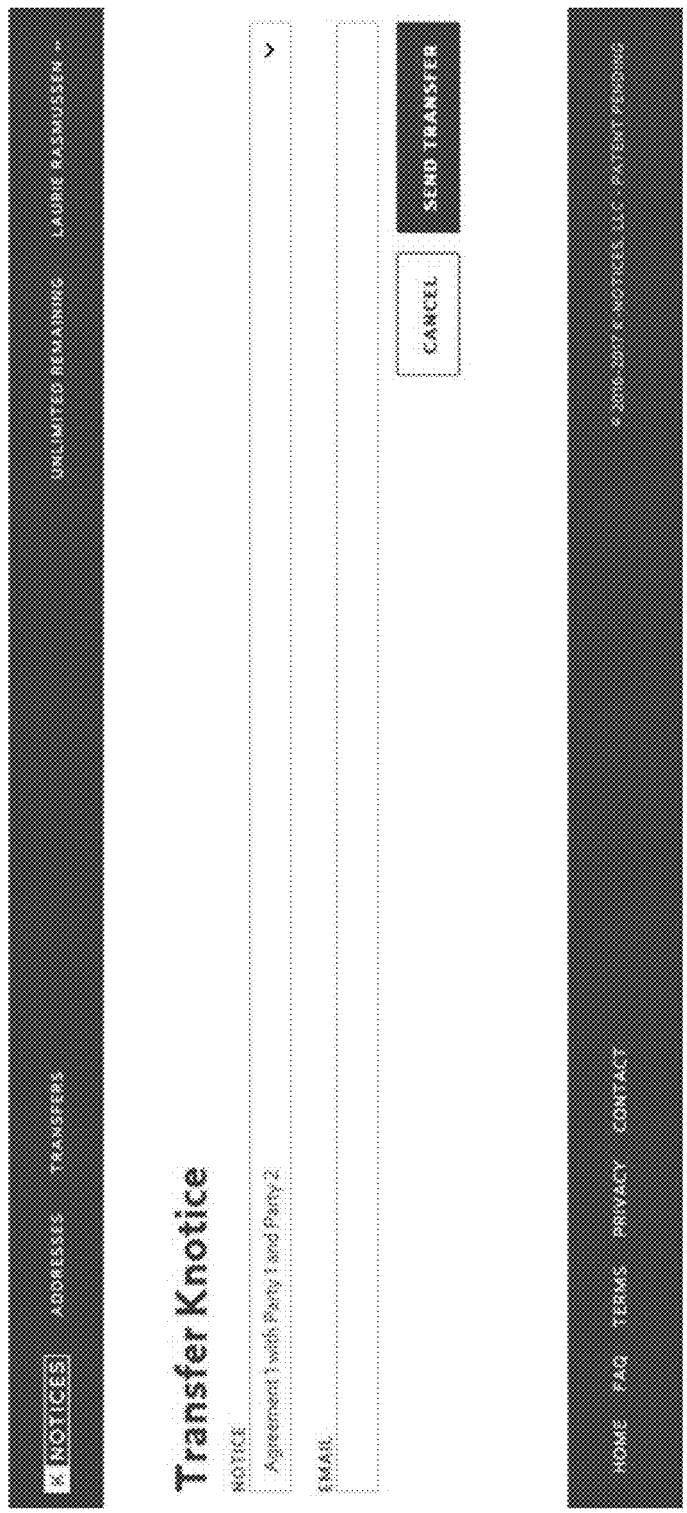
Figure 13:
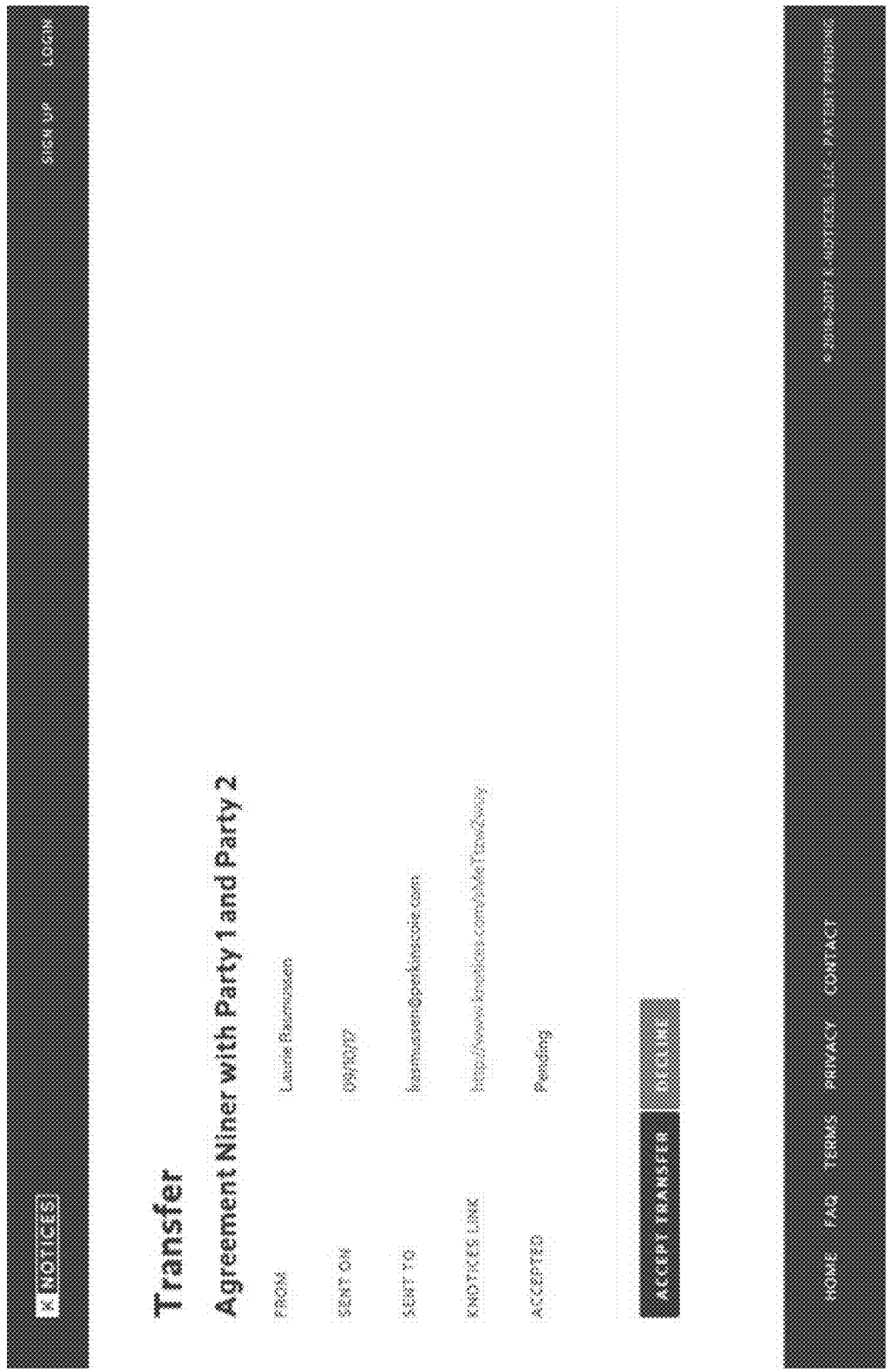

FIG. 11 depicts a user interface for creating a transfer. If the owner selects "New Transfer," the owner will be shown a user interface where the owner is asked to provide the particular informational record to be transferred and an email address to contact the transferee (FIG. 12). The transferee will receive a notification requesting a response to either accept or decline the transfer, as shown in FIG. 13.

Figure 14:
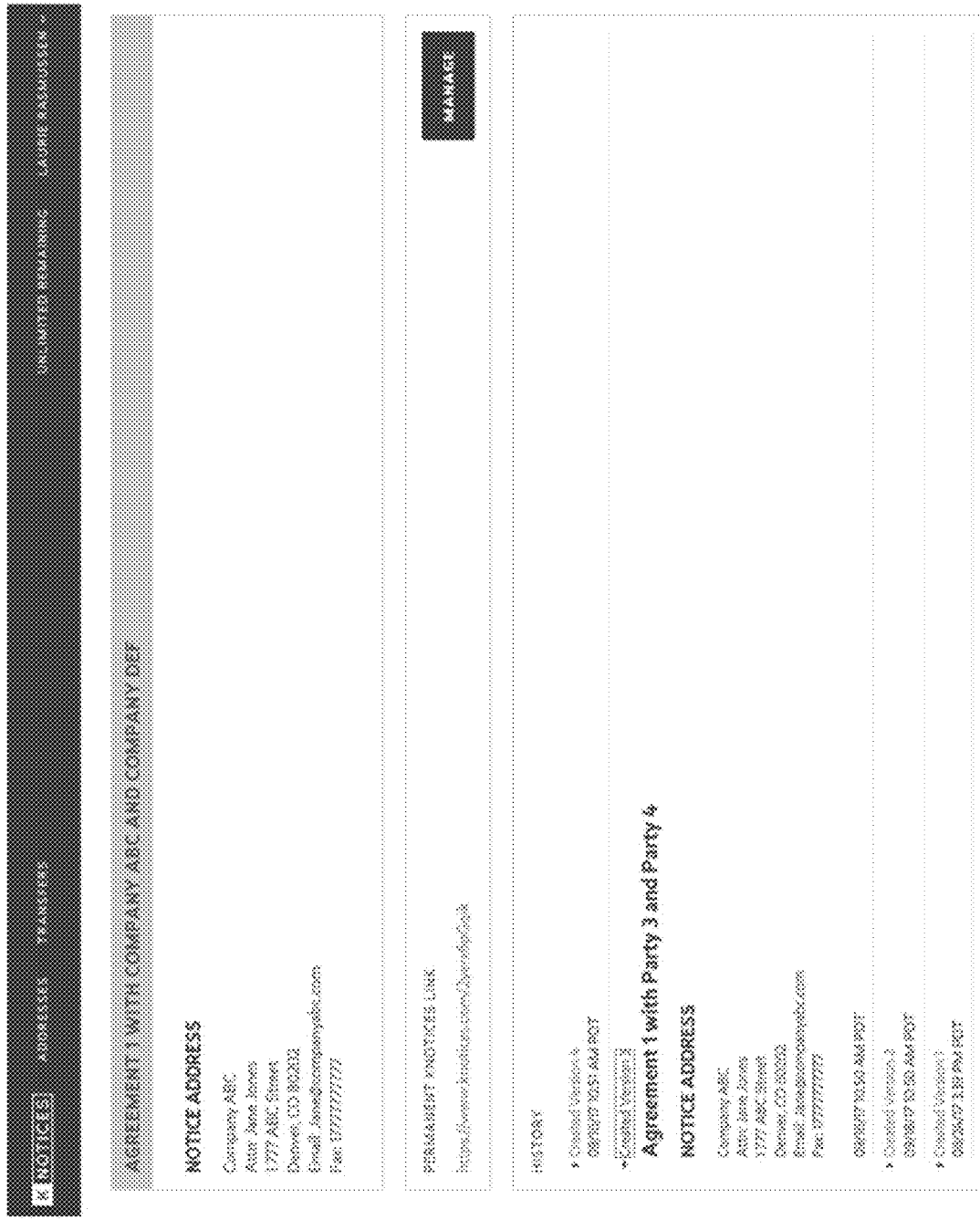

FIG. 14 depicts a user interface that a user may see when the user inputs the website, inputs a code, or otherwise accesses an informational record.

Figure 15:
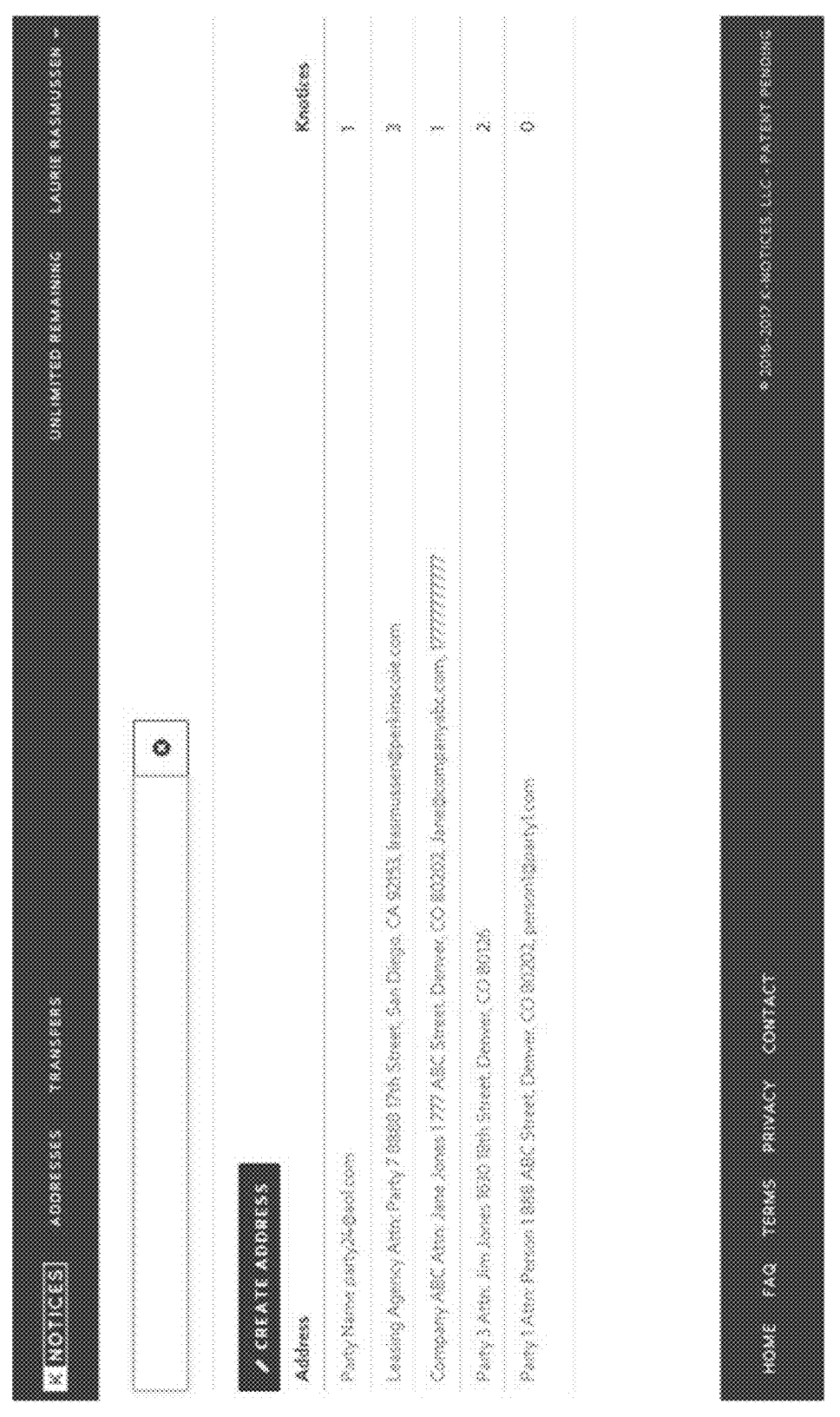

FIG. 15 depicts a user interface allowing a user to view and create electronic contact cards and to see how many informational records are associated with an electronic contact card.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A computerized method of managing contact information, the method comprising:

creating, by a processor, an informational record identifying both: (1) a document, and (2) at least one electronic contact card comprising contact information for an entity associated with the document, generating a unique identifier of the informational record that identifies both the document and the at least one electronic contact card, wherein the unique identifier is used to identify the informational record;

embedding the unique identifier into a link directed to the informational record that identifies both the document and the at least one electronic contact card;

upon receiving a request for a website identified by the link, extracting the unique identifier from the request to obtain the informational record corresponding to the unique identifier;

obtaining, from the at least one electronic contact card identified in the informational record, the contact information for the entity; and providing the contact information to a data processing device so that the contact information is displayable on the data processing device.

2. The computerized method of claim 1, further comprising:

receiving information related to the document, the information including a title of the document and parties to the document, and wherein the document is a contract.

3. The computerized method of claim 1, wherein the informational record comprises previous contact information from previous versions of the at least one electronic contact card and dates the previous contact information was updated.

4. The computerized method of claim 1, further comprising:

receiving, from an owner of the informational record, a request to change the contact information associated with the informational record;

updating the informational record with the changed contact information; and storing the changed contact information and a date associated with the change in the contact information in the database.

5. The computerized method of claim 4, wherein the request to change the contact information includes a request to change the electronic contact card identified by the informational record, and wherein the method further comprises:

identifying one or more informational records associated with the electronic contact card; and simultaneously updating the one or more informational records to reflect the changed contact information and the date associated with the change in the contact information.

6. The computerized method of claim 1, further comprising:

receiving, from an owner of the informational record, a request to change ownership of the informational record to a second owner;

transmitting, to the second owner, an informational record regarding the transfer and requesting an acceptance; and in response to receiving the acceptance:

transferring ownership of the informational record to the second owner, disassociating the electronic contact card from the informational record;

creating a new electronic contact card associated with the informational record, where the new electronic contact card comprises the contact information from the electronic contact card as default contact information; and causing the change of the ownership and a date the ownership was changed to be displayed on the data processing device.

7. The computerized method of claim 1, further comprising:

determining informational records identifying the electronic contact card; and listing the informational records identifying the contact information, wherein the owner of the informational record can change the contact information for the documents simultaneously by changing the electronic contact card.

8. The computerized method of claim 1, further comprising:

receiving a selection of one or more informational records; and receiving a selection to change the contact information, wherein the owner can change the contact information by any one of: adding an additional electronic contact card to each of the selected informational records, replacing all electronic contact cards in each of the selected informational records with the additional electronic contact card, and replacing a selected electronic contact card with another electronic contact card for each of the selected informational records associated with the selected electronic contact card.

9. A system comprising:

at least one processor;

at least one memory having instructions stored thereon that, when executed by the at least one processor, cause a machine to:

receive a universal resource locator that specifies a unique identifier sent from a remote computer over the Internet, wherein the unique identifier identifies an informational record that identifies both; (1) a document, and (2) at least one electronic contact card comprising contact information for an entity associated with the document;

extract the unique identifier from the universal resource locator to obtain the contact information associated with the document;

format the contact information; and transmit the formatted contact information over a communication channel to the remote computer, wherein the transmission causes the contact information to be displayed on the remote computer.

10. The system of claim 9, wherein the instructions, when executed by the processor, further cause the machine to:

receive a request from a first entity to transfer the unique identifier to a second entity;

transmit an acknowledgment request to the second entity; and upon receiving the acknowledgement from the second entity:

transfer ownership of the informational record from the first entity to the second entity, disassociate the electronic contact card from the first entity, and create a second electronic contact card associated with the transferred informational record.

11. The system of claim 9, wherein the instructions, when executed by the processor, further cause the machine to change the informational record and other selected informational records, wherein the informational record and the other selected informational records are changed by any one of:

receiving an edit to an electronic contact card associated with the informational record or the other selected informational records, adding an electronic contact card to the informational record and the other selected informational records, replacing each electronic contact card associated with the informational record and the other selected informational records with another electronic contact card, replacing a selected electronic contact card with another electronic contact card for the informational record and each of the other selected informational records associated with the selected electronic contact card, and receiving an update to the informational record, wherein the update is one of changing a title of the document or adding notes to the informational record.

12. The system of claim 9, wherein the instructions, when executed by the processor, further cause the machine to:

tag the document according to a category, and wherein the category includes buyer, seller, party, contact information, line of business, or business division; and transmit notification data to be displayed on the remote computer, the notification data including previous contact information from previous versions of the electronic contact card and dates the previous contact information was updated.

13. A computerized method of managing contact information, the method comprising:

receiving, via a network, an identity of a document and contact information for an entity associated with the document, wherein the contact information is contained in an electronic contact card;

creating, by a processor, an informational record that identifies both: (1) the document, and (2) the electronic contact card comprising contact information for the entity associated with the document;

generating a unique identifier of the informational record, wherein the unique identifier is used to identify the informational record;

receiving, from a remote server, a request for a website associated with the informational record, wherein the request includes the unique identifier;

obtaining the informational record corresponding to the unique identifier; and providing the contact information from the electronic contact card identified by the informational record to a data processing device so that the contact information is displayable on the data processing device.

14. The computerized method of claim 13, wherein the unique identifier is a uniform resource locator (URL) for the website.

15. The computerized method of claim 13, wherein the unique identifier is a code, wherein the computerized method further comprises receiving the code at the website.

16. The computerized method of claim 15, wherein the code is a quick response code or a bar code, wherein the code is scanned into a mobile device to automatically access the contact information using the code.

17. The computerized method of claim 13, further comprising:

tagging the document according to a category, and wherein the category includes buyer, seller, party, contact information, line of business, or business division; and when the contact information is changed, automatically sending a group message to entities based on the tags.

18. The computerized method of claim 13, further comprising:

receiving a request to change the contact information associated with the electronic contact card;

identifying one or more informational records associated with the electronic contact card;

updating the electronic contact card with the changed contact information;

storing, in a database, the electronic contact card with the updated contact information; and simultaneously changing the one or more informational records to reflect the changed contact information and a date associated with the change in the contact information.

19. The computerized method of claim 18, wherein the informational record includes a notes section for notes related to the informational record, wherein the owner can search for informational records using by content included in the notes, wherein the unique identifier is included on the document, wherein:

a device scans the document; and identifies the unique identifier.

20. The computerized method of claim 13, wherein the document is linked to a system that creates informational records and corresponding unique identifiers, wherein the computerized method further comprises automatically placing the unique identifier associated with the informational record in the document.

* * * * *